(12) United States Patent  
Bailey (10) Patent No.: US 11,692,641 B2
(45) Date of Patent: Jul. 4, 2023

(54) FLUID VALVE CONTROL DEVICE (71) Applicant: Jeffrey Bailey, Woodstock, NH (US)

(72) Inventor: Jeffrey Bailey, Woodstock, NH (US)

( * ) Notice: Subject to any disclaimer, the term of this patent is extended or adjusted under 35 U.S.C. 154(b) by 0 days.

(21) Appl. No.: 17/526,020

(22) Filed: Nov. 15, 2021

(65) Prior Publication Data
US 2023/0151904 A1 May 18, 2023

(51) Int. Cl.
*F16K 31/60* (2006.01)
*F16B 2/18* (2006.01)

(52) U.S. Cl.
CPC ............ *F16K 31/60* (2013.01); *F16B 2/185* (2013.01)

(58) Field of Classification Search
CPC ................................ F16K 31/60; F16B 2/185
USPC .......................................... 251/231, 213, 293
See application file for complete search history.

(56) References Cited

U.S. PATENT DOCUMENTS

| | | | | |
|---|---|---|---|---|
| 524,848 A * | 8/1894 | Doebler | ............... | E05B 3/04 292/355 |
| 935,019 A * | 9/1909 | Hallowell | ............... | F16K 31/60 16/432 |
| 995,027 A * | 6/1911 | Mueller | ............... | F16K 37/0008 411/397 |
| 1,170,138 A * | 2/1916 | Bohne | ............... | B25B 23/12 251/293 |
| 1,391,012 A * | 9/1921 | Schulder | ............... | F16K 31/60 251/291 |
| 1,598,767 A * | 9/1926 | Frankenberger | ........ | F16K 31/60 403/359.5 |
| 1,707,353 A * | 4/1929 | Fraser | ............... | F16K 31/60 292/355 |
| 1,929,708 A * | 10/1933 | Morris | ............... | F16K 31/60 16/DIG. 30 |
| 1,989,083 A * | 1/1935 | Dahnken | ............... | F16K 31/60 251/291 |
| 2,023,951 A * | 12/1935 | Cohan | ............... | F16K 31/60 403/359.1 |
| 2,047,703 A * | 7/1936 | Podolsky | ............... | F16K 31/60 403/3 |
| 2,098,515 A * | 11/1937 | Pardieck | ............... | F16K 31/60 403/384 |
| 2,233,962 A * | 3/1941 | Rover | ............... | F16K 31/60 403/3 |
| 2,305,099 A * | 12/1942 | Morris | ............... | F16K 31/60 403/362 |
| 3,503,586 A * | 3/1970 | Bordes | ............... | F16K 1/38 251/266 |
| 3,880,189 A * | 4/1975 | Bennett | ............... | F16K 31/44 251/305 |
| 5,216,781 A * | 6/1993 | Brondfield | ............... | E05F 11/10 16/426 |

* cited by examiner

*Primary Examiner* — Umashankar Venkatesan
(74) *Attorney, Agent, or Firm* — Patent Negotiator, PLLC; Sarita Pickett (57) ABSTRACT The present invention is an improved fluid valve control device which attaches to a pre-existing and pre-installed hex head valve. The valve control device has at least one lever which can be used to turn the valve on or off. This device can be attached to a manifold assembly that has a valve which typically requires a tool to control so that it eliminates the need for a separate tool being used to turn the valve on or off after installation at relatively low cost.

19 Claims, 10 Drawing Sheets

FLUID VALVE CONTROL DEVICE

This application claims benefit to a provisional application No. 63/158,911, filed on Mar. 10, 2021.

BACKGROUND OF THE INVENTION

1. Field of the Invention

The present invention relates generally to fluid valve control devices. Particularly, the present invention relates to devices provided to shut off fluid valves.

2. Description of the Prior Art

Fluid valves require specialized tools in order to control pressure flow. These tools are required in order to increase, decrease, and eliminate fluid volume flow levels. Essentially, these tools are required in order to turn the fluid valve on or off. There are a number of solutions for these fluid valve control tools.

SUMMARY OF THE INVENTION

Advantages and Differences of Invention Over Known Prior Art

Some of the prior art solutions attempt to be easy and efficient, but these solutions fail to meet the needs of the industry because when a valve needs to be turned off quickly to avoid danger, searching for a tool is very time consuming. Failure to find the correct tool within the limited time frame can possibly result in harm.

Other solutions attempt to meet these needs but end up being just as difficult. These solutions are similarly unable to meet the needs of the industry. Still, other solutions seek to be better, but these solutions also fail to meet industry needs because they are still tools that get lost or misplaced. That is, while many valves may be purchased today with built-in levers, there are still many valves that are currently installed that do not have levers.

While one option might be to completely replace all the current valves with valves that have built-in levers, this option has many downsides. These valves are generally not failing, or otherwise malfunctioning, so to remove them before they corrode would be considered extremely wasteful. This waste in addition to increased costs involved for replacing each valve with a new built-in lever valve, in addition to the cost of the additional work, make this an unsuitable option for most contractors.

Therefore, there currently exists a need in the industry for a device that is attachable to a current valve which would provide levers for easy rotation without the need for a tool to turn valves on or off easily. It would be desirable to have a device which can increase the safety of surroundings and circumstances by replacing the need for searching for a tool and thereby help prevent a dangerous incident with low-pressure (or high-pressure) fluids or gases in the event that a valve needs to be shut off quickly.

Similarly, it would be desirable to have an associated method that attaches easily but does not wear easily. Therefore, there currently exists a need in the industry for a process that allows for a control device to attached easily on a valve which will not fall off or wear out easily yet will allow the valve to be turned on or off without the need to search for a tool to do so.

It is an object of the present invention to meet these needs of the industry by providing an improved fluid control device that replaces the need for a tool to turn a valve on or off which is easily applied to the valve and does not fall off.

Another way in which the present invention meets these objectives is by providing an improved fluid control device that is small and efficient.

A further way in which the present invention meets these objectives is by providing an improved fluid control device that is strong enough to not easily wear out when turning a valve on or off.

The present invention meets these objectives by providing an improved fluid control device having at least one handle or lever. This lever may be made up of high stress components such as high-density plastic or metal. This lever or handle is durable and has additional leverage points to assist in the ease of use.

The present invention also meets these objectives by providing an improved fluid valve control device capable of locking engagement with a hex head of a hex head valve. Such a fluid valve control device may have a main body having a top wall and side walls which extend perpendicularly from opposing edges of the top wall. An inner hex head channel may be defined by the top wall and side walls, extending therein.

This device generally has at least one lever extending outward from side walls of the main body. In order to lockingly engage the hex head, a locking mechanism extends along an internal surface of the hex head channel. The locking mechanism may have a first curvature and a second curvature opposite the first curvature.

The locking mechanism may extend outward from the internal surface of the inner hex head channel. In one embodiment, the locking mechanism has a first curvature and extends inward into the internal surface of the inner hex head channel.

In one embodiment, the locking mechanism has at least a first concave curvature and a second convex curvature which is opposite the first curvature.

The device itself has a top wall which has varying thicknesses such that a height of the inner hex head channel varies from at least a first height to at least a second height. The improved fluid valve control device have at least one lever extending outward from the side walls of the main body. Alternatively, that at least one lever could be simply a first lever, and a second lever can extend outward from the side walls of the main body opposite the first lever.

A height of the at least one lever can be equal to a height of the main body.

The present invention also meets these objectives by providing a method for improved fluid valve control of a pre-installed hex head valve having a hex head. This method includes providing a fluid control device such as described above. Then, aligning the inner hex head channel of the fluid control device with the hex head of the hex head valve. The fluid control device can then be manually fastened onto the hex head of the hex head valve by causing the hex head to interact with the locking mechanism extending along the internal surface of the hex head channel.

This enables manual engagement of the at least one lever extending outward from side walls of the main body, thereby enabling manual rotation of the fluid control device via the manual engagement of the at least one lever. This in turn facilitates altering a position of the hex head of the hex head valve from at least a first position to at least a second rotated position without any additional tools.

This method may involve irreversibly engaging the fluid control device with the hex head valve through irreversible locking engagement of the locking mechanism. Alternatively, this method may simply provide reversibly engaging the fluid control device with the hex head valve through reversible interlocking engagement of the locking mechanism.

The improved fluid control device may also have one or more of the following: leverage points, connectors. The improved fluid control device may be comprised of multiple types of plastic or metal and provided in different colors. Similarly, the associated method may also include one or more of the following steps: snap on or mechanically fasten.

The disclosed device is unique when compared with other known devices and solutions because it provides (1) a quick way to turn the valve; (2) time savings looking for a tool; and (3) a safer method to turn valves on or off. Similarly, the associated method is unique in that it: (1) it can snap onto a valve; (2) it is durable; and (3) it does not easily fall off. Similarly, the disclosed method is unique when compared with other known processes and solutions in that it: (1) it snaps on; (2) it can be mechanically fastened; and (3) has leverage points.

The disclosed device is unique in that it is structurally different from other known devices or solutions. More specifically, the device is unique due to the presence of (1) it securely fastens; (2) has good leverage; and (3) stays in place.

Furthermore, the process associated with the aforementioned device is likewise unique. More specifically, the disclosed process owes its uniqueness to the fact that it (1) turns easily, (2) applies easily, and (3) it holds its shape.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The present invention is an improved fluid control device that can attach to any fluid valve which eliminates needing a tool for turning it on or off. This device may, however, be embodied in many different forms and the following disclosure should not be construed as being limited to the embodiments set forth herein; rather, these embodiments are provided by way of illustration only and so that this disclosure will be thorough, complete, and fully convey understanding to those skilled in the art.

DETAILED DESCRIPTION OF THE INVENTION

The preferred embodiment of the present invention is illustrated in FIGS. 1-11 and 20. The present invention is directed to an improved fluid valve control device 10 that attaches to a hex head 6 of a fluid valve 4 for an industrial pipe 2 which eliminates need for a separate tool for turning a valve 4 on or off. This embodiment shown is the most common embodiment, having dimensions suitable for use on a 5/16 hex head fluid valve 4.

This improved valve control device 10 of the present invention can be used to attach to a manifold assembly that has a valve which typically requires a tool to turn the valve on or off. The core components of the improved valve control device include a main body 20 and a pair of levers 50 which are discussed in greater detail further below. Together, this main body 20 and the pair of levers 50 forms a tee shaped device capable of snapping onto the valve head 6.

Figure 1:
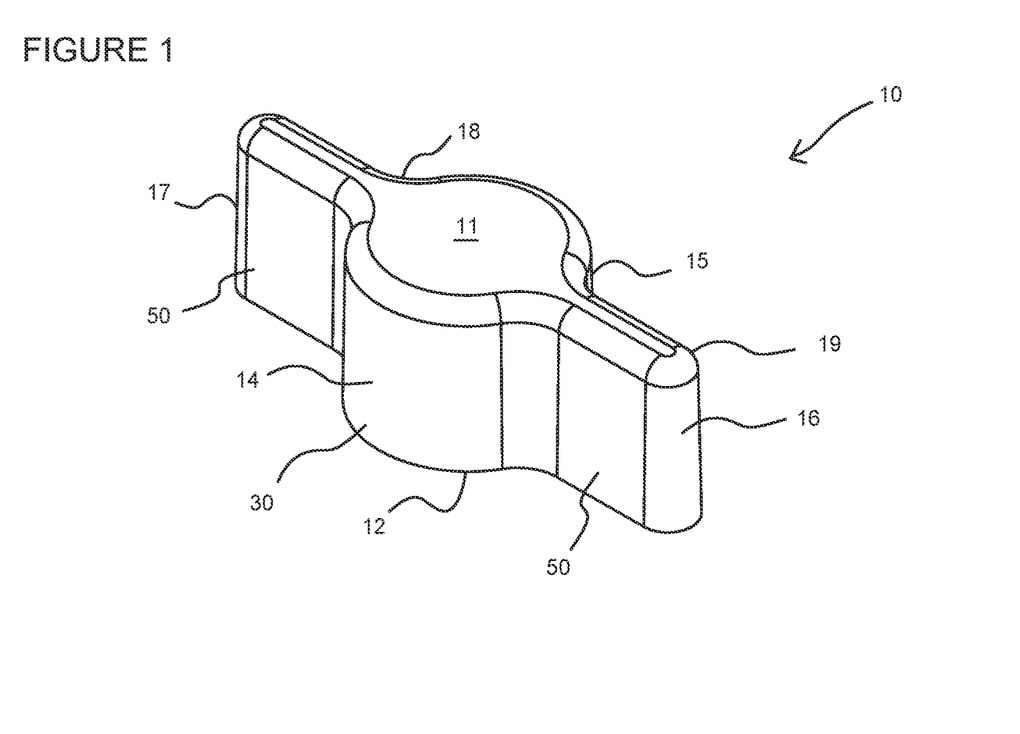
FIG. 1 is a front top right perspective view of one embodiment of the device of the present invention.
Figure 2:
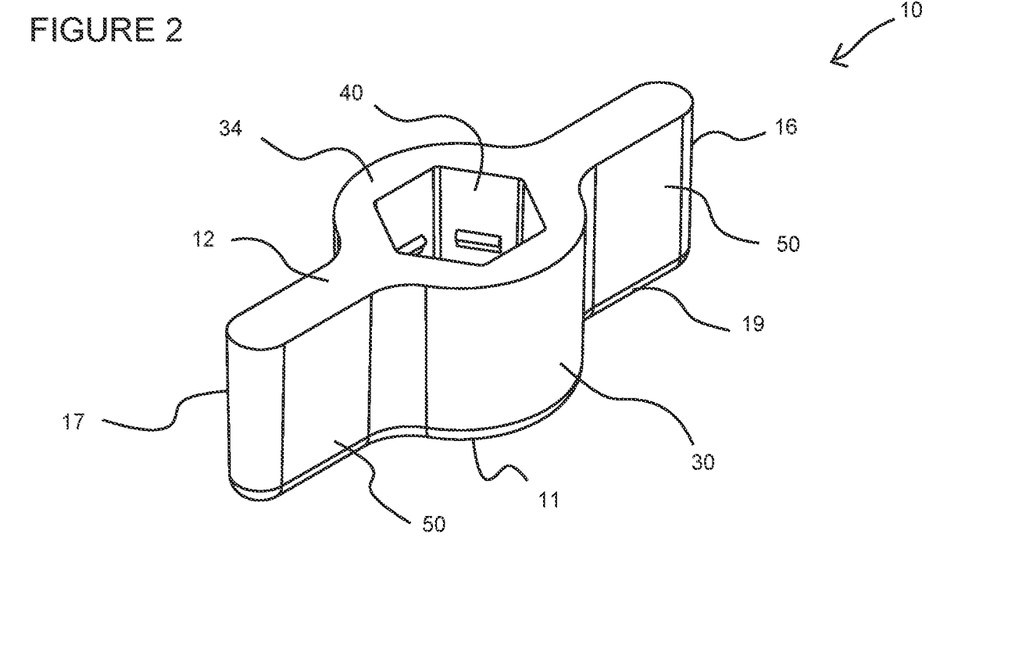
FIG. 2 is a front bottom left perspective view of the embodiment of the device of the present invention shown in FIG. 1.
Figure 3:
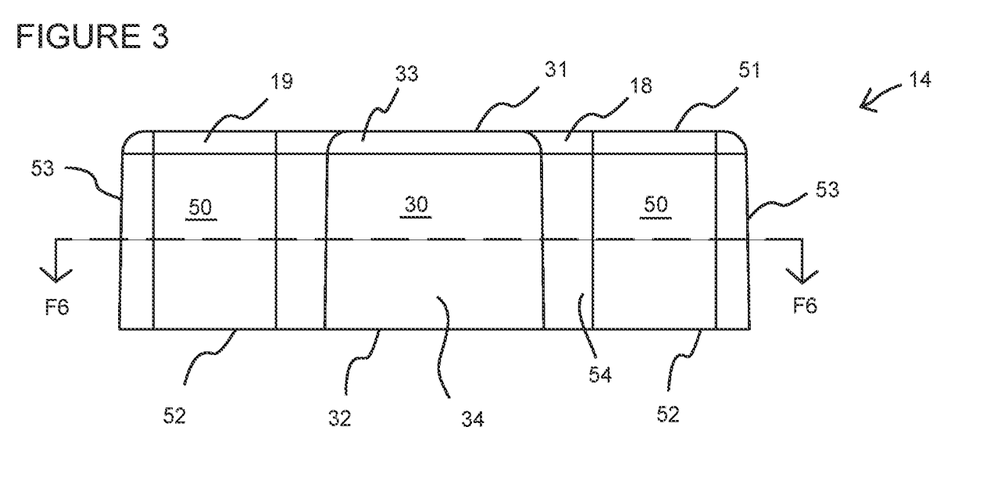
FIG. 3 is a front planar view of the embodiment shown in FIG. 1 showing the placement of section line F6-F6.
Figure 4:
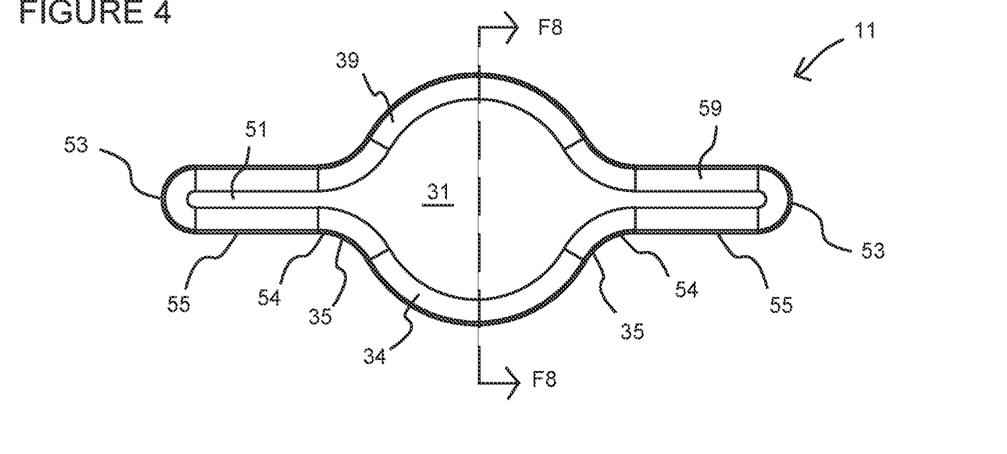
FIG. 4 is a top planar view of the embodiment shown in FIG. 1 showing the placement of section line F8-F8.
Figure 5:
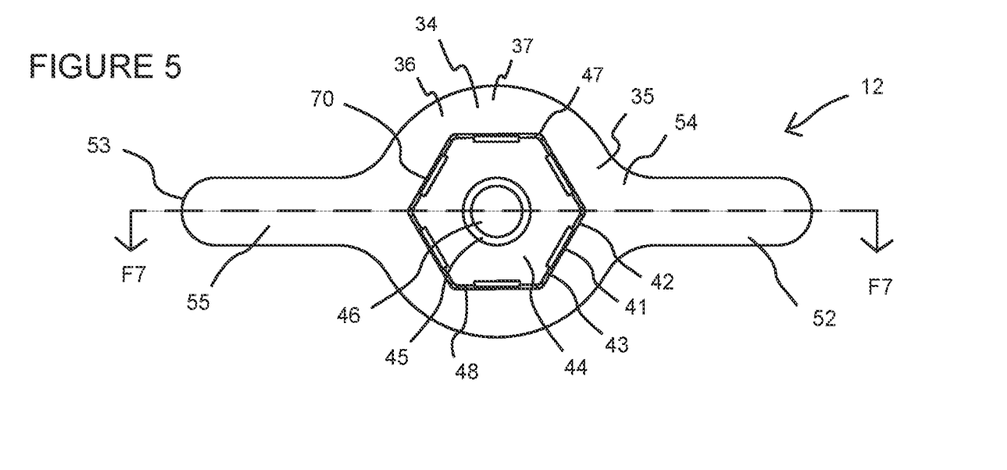
FIG. 5 is a bottom planar view of the embodiment shown in FIG. 1 showing the placement of section line F7-F7.
Figure 6:
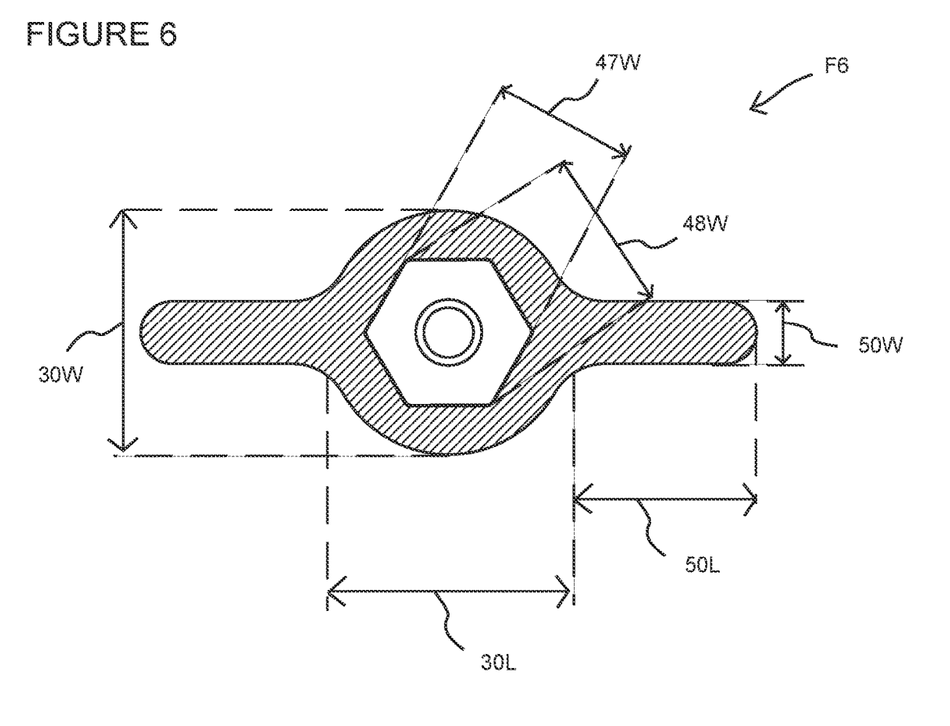
FIG. 6 is a cross-sectional view of the embodiment according to FIG. 1 viewed from along section line F6-F6.
Figure 7:
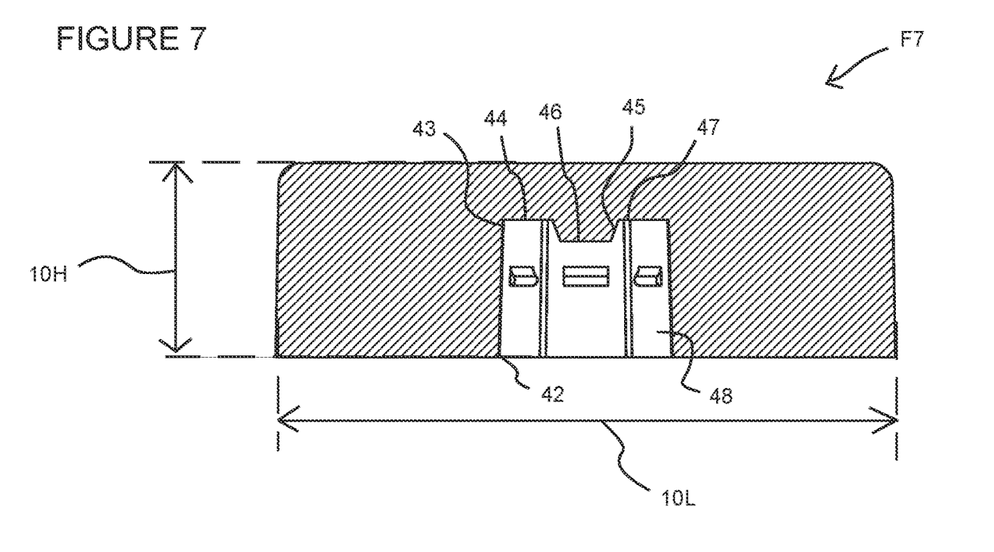
FIG. 7 is a cross-sectional view of the embodiment according to FIG. 1 viewed from along section line F7-F7.

FIGS. 1 and 2 illustrate a front top right perspective view and a front bottom left perspective view, respectively, of one embodiment of the improved control device 10 of the present invention. The top wall 11 of the improved control device 10 has an upper surface 31 of the main body 30 and an upper surface 51 of the pair of levers 50. The convex filleted corners 19 are continuous and integrated portions of the filleted corners 39 of the main body 30 and the filleted corners 59 of the levers 50.

The filleted corners 19, 39, 59 work to join the top upper surfaces 31, 51 with the walls 34,55 in an outwardly gentle curved fashion. In a similar manner, the concave filleted edges 18 meet the main body 30 and the levers 50 in an inverse gentle curved fashion. The filleted corners 19, 39, 59 have a radius of curvature between 1 to 0.001, more preferably between 0.5 to 0.02 inches, and for this embodiment, most preferably about 0.050 inches. The filleted edges 18 have a radius of curvature between 1 to 0.01, more preferably between 0.5 to 0.1 inches, and for this embodiment, most preferably about 0.125 inches.

The height 10H of the improved control device 10 is generally between 2 to 0.1, more preferably between 1 to 0.2 inches, and for this embodiment, most preferably about 0.44 inches. The length 10L of the improved control device 10 is generally between 3 to 0.5, more preferably between 2 to 0.1 inches, and for this embodiment, most preferably about 1.4 inches. The width 10W of the improved control device 10 is generally between 2 to 0.1, more preferably between 1 to 0.2 inches, and for this embodiment, most preferably about 0.56 inches.

The embodiment shown here is comprised of integrated components and thus is easier to make when made from molded plastic or metal. These components are durable and lightweight when comprised of HDPE, glass filled, aluminum, and/or steel. It should further be noted that these can be made of many materials that are strong and light weight so long as they do not suffer wear easily.

With respect to the improved valve control device 10, it should be further noted that installation can be performed by being snapped onto or fastened by some sort of set screw or spring-loaded clip to secure it to the valve. By facilitating a secure irreversible attachment, the valve is capable of being turned on or off with the improved valve control device without worry of locating a tool or losing them from falling off easily.

Main Body 30

The main body 30 of the improved fluid valve control device 10 according to the present invention is shown from various perspectives in FIGS. 1-11. The main body 30 is capable of permanent attachment to the hex head 6 of a separate, previously installed fluid valve 4. This eliminates the need for separate tools at later times to turn the valve 4 on or off.

The main body 30 has an upper surface 31 and a bottom surface 32 with side walls 34 surrounding and defining the hex head channel 40. The sidewalls 34 meet the upper wall of the upper surface 31 along filleted corners 39 in a general curve. Being cylindrical in shape, the outer surface of the side walls 34 are also curvaceous, while the inner surface of the side walls 34 forms a hexagon, therefore the side walls 34 of the main body 30 have narrower portions 36 and wider portions 37. The side walls 34 also have a connecting portion 35 which meet the inner portion 54 of the adjacent lever 50 to form a concave corner 18.

The main body 30 is generally cylindrical and has a diameter between 2 to 0.1, more preferably between 1 to 0.2 inches, and for this embodiment, most preferably about 0.56 inches. The height 10H of the device is equal to the height of the main body 30 and the height of the levers 50. In this case then, the height of the main body 30 is generally between 2 to 0.1, more preferably between 1 to 0.2 inches, and for this embodiment, most preferably about 0.44 inches.

Figure 8:
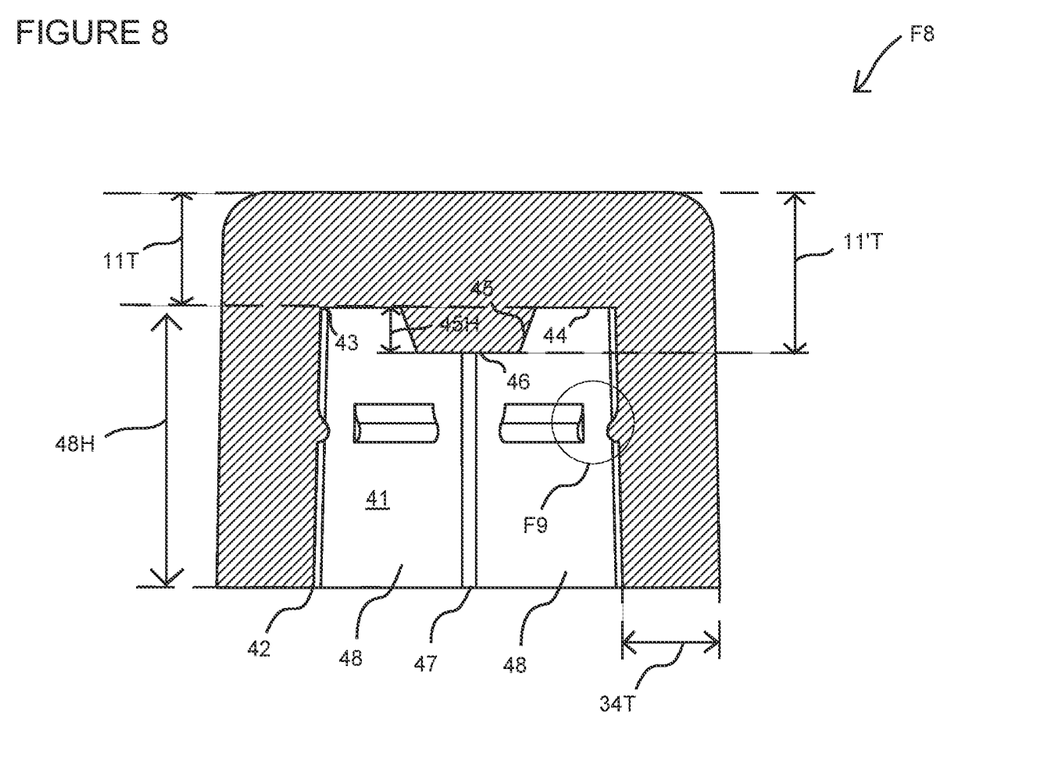
FIG. 8 is a cross-sectional view of the embodiment according to FIG. 1 viewed from along section line F8-F8.
Figure 9:
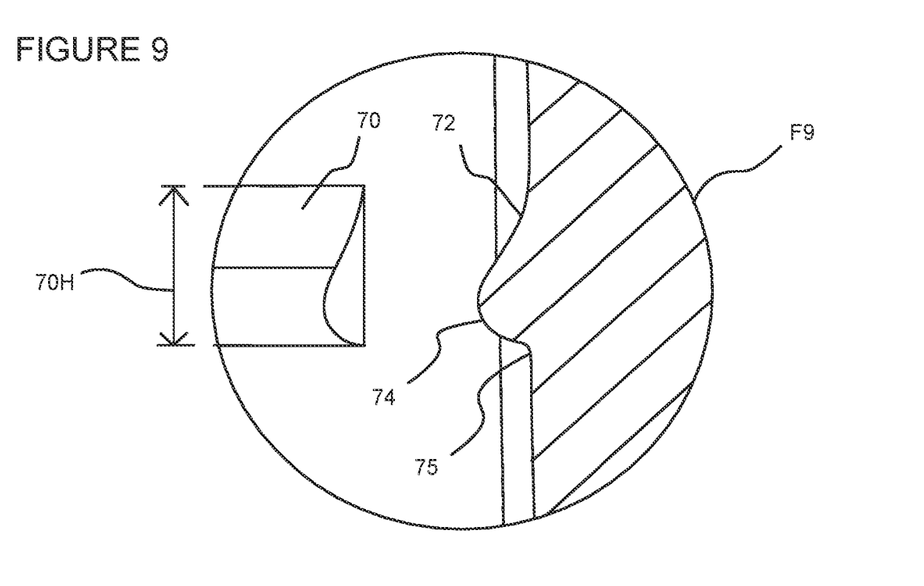
FIG. 9 is an enlarged view of details of the embodiment according to FIG. 1 as identified by line F9 shown in FIG. 8.

As shown in FIG. 8, the thickness of the ceiling 11 varies. Or as otherwise stated, a first portion of the main body 30 above the hex head channel 40 has varying thicknesses. A first thickness 11'H is defined as the distance from the upper exterior surface 31 to the first interior surface of the first internal portion 44 of the hex head channel 40. The first ceiling thickness 11'H is generally between 2 to 0.05, more preferably between 1 to 0.1 inches, and for this embodiment, most preferably about 0.128 inches.

A second thickness 11"H of the ceiling 11 is defined by the distance from the upper exterior surface 31 to the second interior surface of second portion 46 of the hex head channel 40. The second thickness 11"H is generally between 2.5 to 0.05, more preferably between 1.2 to 0.1 inches, and for this embodiment, most preferably about 0.178 inches.

Hex Head Channel 40

Figure 10:
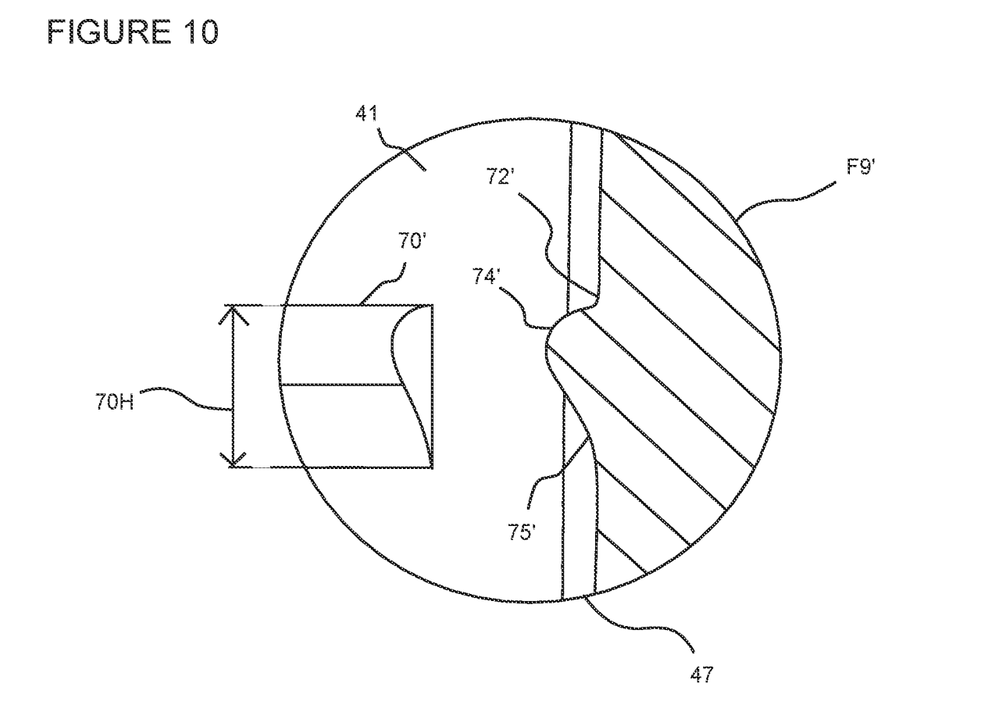
FIG. 10 is an alternative enlarged view of details of an alternative embodiment according to FIG. 1 as identified by line F9 shown in FIG. 8.
Figure 11:
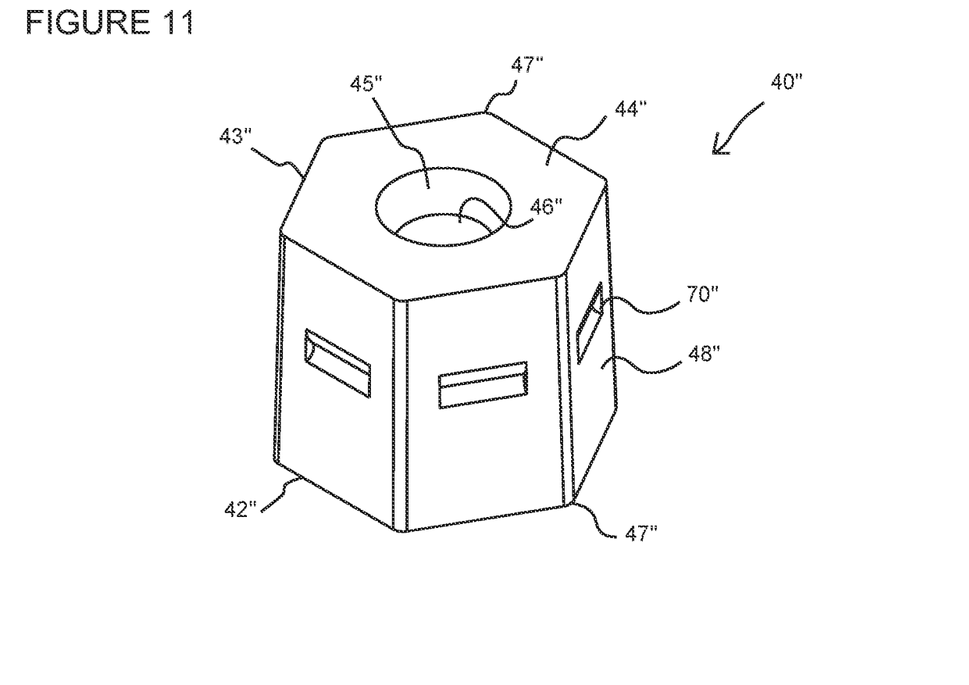
FIG. 11 is an enlarged conceptual front top right perspective view of the shape of the hex head channel of the embodiment according to FIG. 1.
Figure 12:
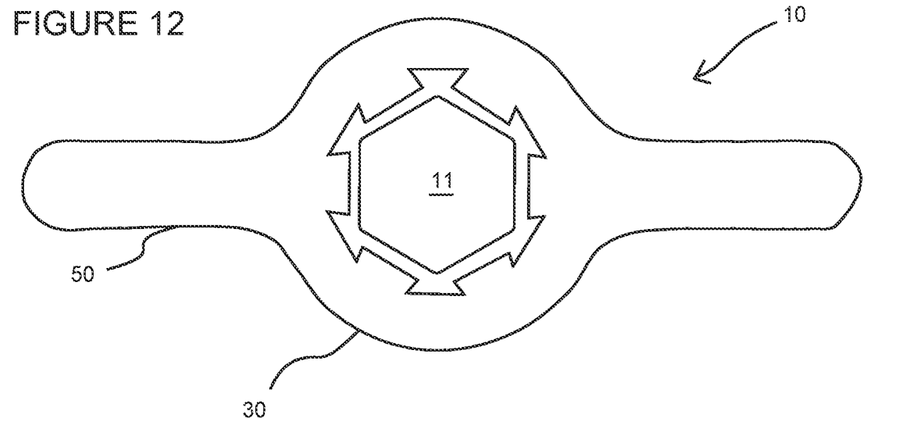
FIGS. 12-19 are alternative embodiments of the device according to the present inventive concepts having an alternate main body and a various number of handles connected to the main body.
Figure 13:
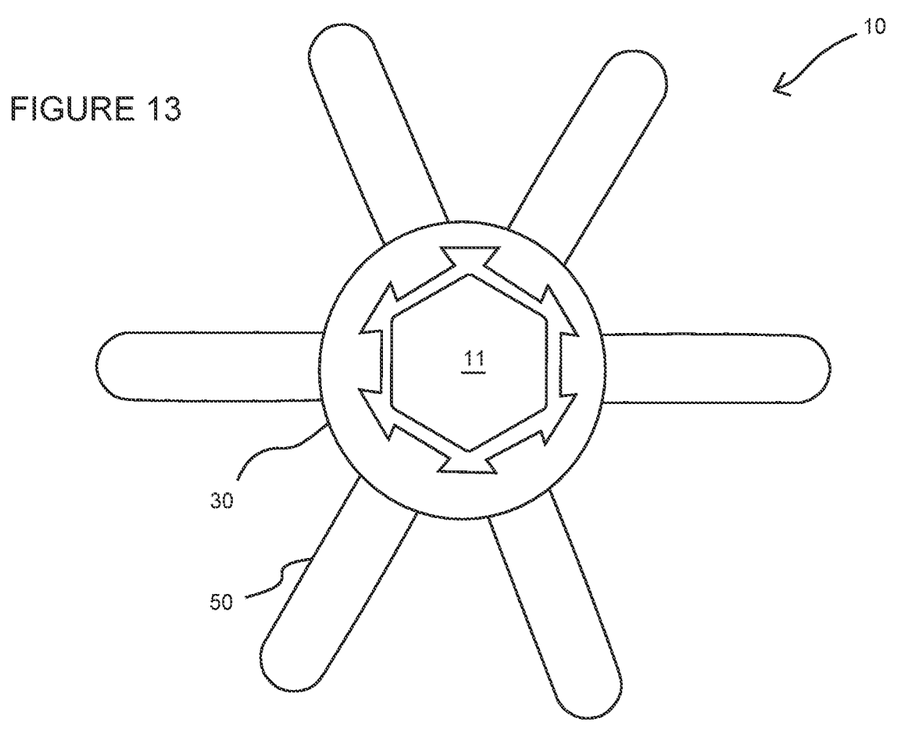
Figure 14:
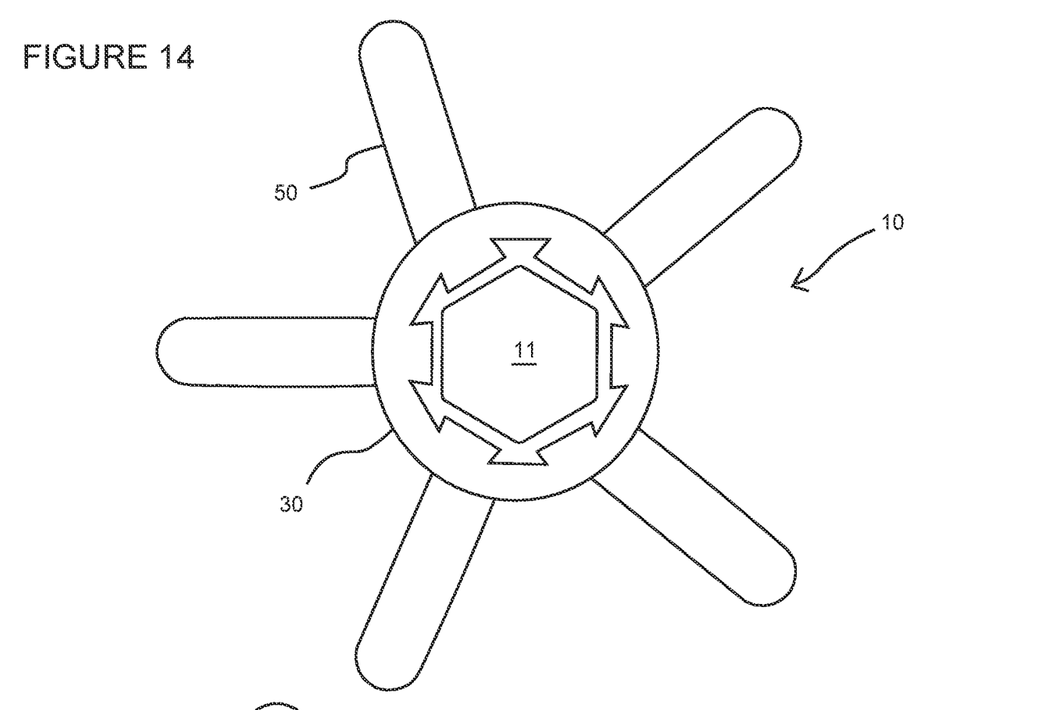
Figure 15:
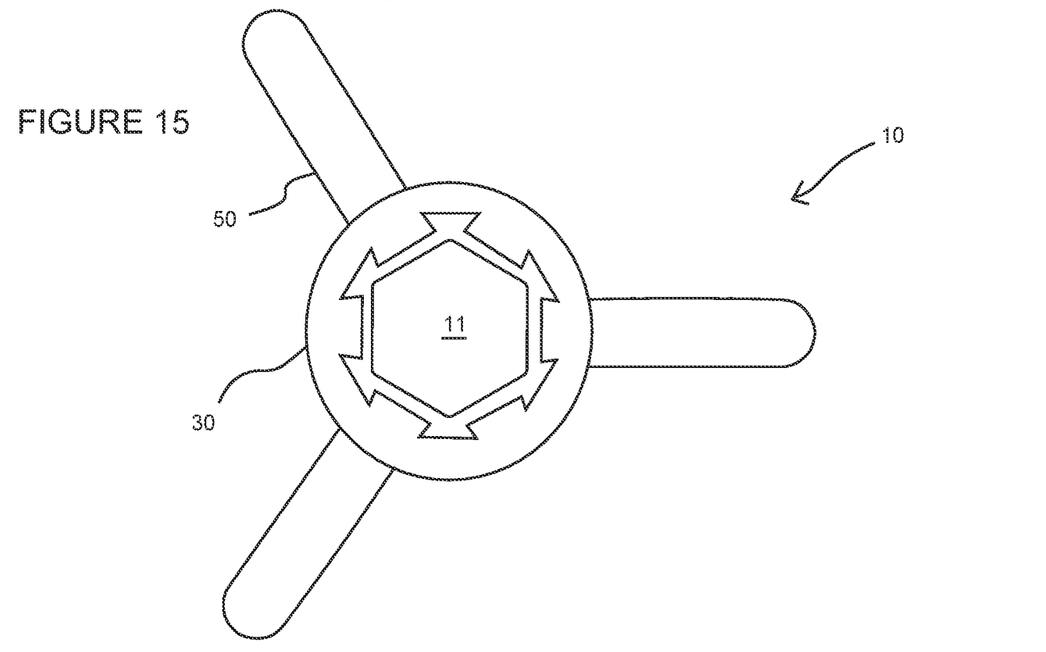
Figure 16:
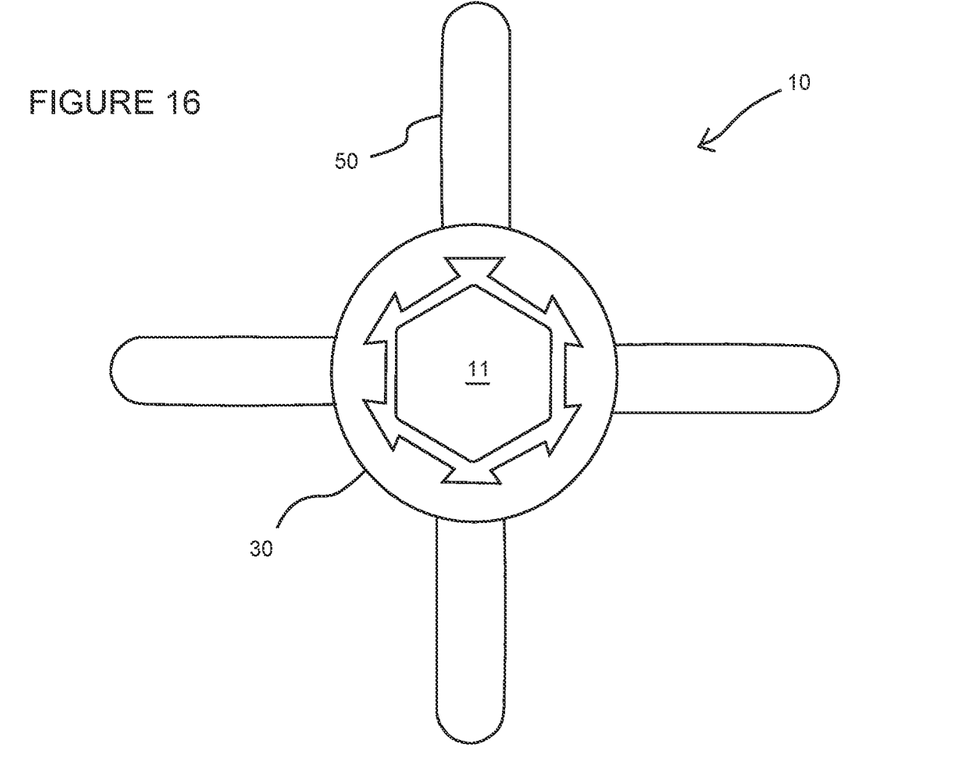
Figure 17:
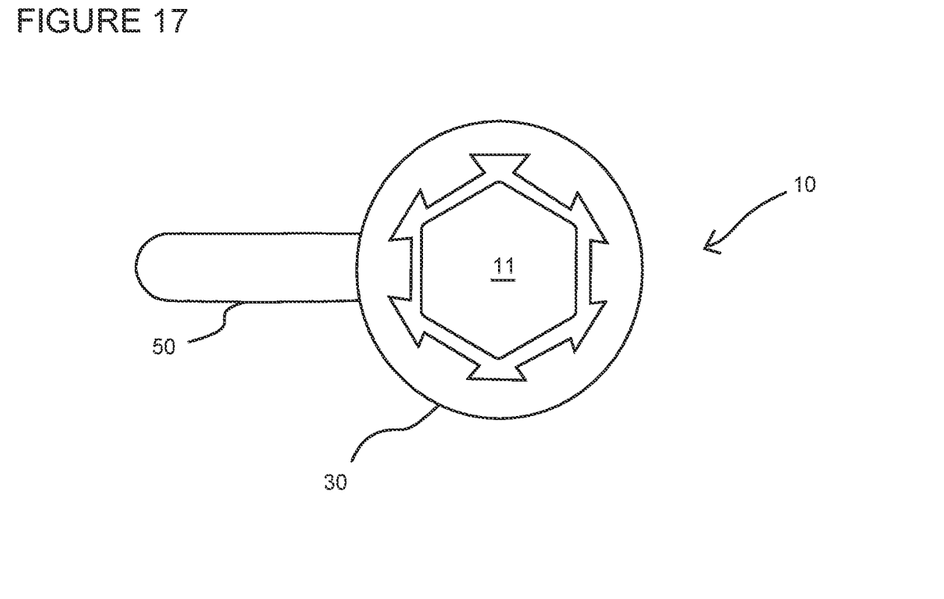

The hex head channel 40 is shown in FIG. 2, 5-10 and the shape of the hex head channel 40 is shown in relief in FIG. 11. The hex head channel 40 extends vertically into the main body 30 perpendicularly to the levers 50 extending from the main body 30. The side walls 34 have an inner surface 41 with sides 48 which meet along corners 47. The side walls 34 slope inward so that the bottom perimeter 42 is larger than the upper perimeter 43. The sides 48 of the hex head channel 40 ceiling has a first outer portion 44 at a first height 48H. A transition portion 45 having a height 45H extends downward from the first outer portion 44 to meet an inner portion 46.

The hex head channel 40 has an internal distance 48W which is measured from one side 48 to an opposing side 48 along the larger perimeter 42 of between 2 to 0.1, more preferably between 1 to 0.2 inches, and for this embodiment, most preferably about 0.344 inches. The hex head channel 40 has an internal distance 47W which is measured between diagonally opposing vertices 47 along the larger perimeter 42 of between 2 to 0.1 inches, more preferably between 1 to 0.2 inches, and for this embodiment, most preferably about 0.4 inches.

As previously discussed, and as shown in FIG. 8, the thickness of the ceiling 11 varies, which causes the height of the hex head channel 40 to vary according to each associated portion. The tallest vertical height 48H of the hex head channel 40, is generally between 2 to 0.1, more preferably between 1 to 0.2 inches, and for this embodiment, most preferably about 0.312 inches (0.44 inches−0.128 inches). The shorter vertical height of the interior ceiling portion 46, when measured from the base of the main body 40, is generally between 1 to 0.05, more preferably between 0.5 to 0.1 inches, and for this embodiment, most preferably about 0.262 inches (0.44 inches−0.128 inches−0.05 inches). The vertical height 45H of the transitioning ceiling portion 45, when measured from the main ceiling portion 44 to the interior portion 46, is generally between 1 to 0.01, more preferably between 0.7 to 0.02 inches, and for this embodiment, most preferably about 0.05 inches.

Levers 50

The embodiment shown in FIGS. 1-11 has a pair of levers 50 extending from the main body 30 of the improved fluid valve control device 10 according to the present invention. The pair of levers need to be able to clear each side when installed so they do not hit each other when turning and can utilize one or multiple leverage points.

The width 50W of the main portion of the levers 50 is generally between 2 to 0.01, more preferably between 1 to 0.05 inches, and for this embodiment, most preferably about 0.15 inches. The width 50W of the levers 50 increases at the inner edge 54 where the levers 50 meet the main body 50 along the connecting portion 35 of the side walls 34.

The height 10H of the device is equal to the height of the main body 30 and the height of the levers 50. In this embodiment then, the height of the levers 50 is generally between 2 to 0.1, more preferably between 1 to 0.2 inches, and for this embodiment, most preferably about 0.44 inches. In most embodiments, the length 50L of the lever 50 should be about twice the length of the main body 30 to provide sufficient pressure and leverage. As such, the length 50L of the levers 50 individual is generally between 2 to 0.1, more preferably between 1 to 0.2 inches, and for this embodiment, about 0.42 inches, (with a combined length of 0.84 inches).

Locking Mechanism 70

Extending outward from the inner surface 41 of the side walls 34 of the main body 30 within the hex head channel 40 are locking mechanisms 70. These locking mechanisms 70 extend outwards into the hex head channel 40 so as to form an interference fit with the hex head 6 of the fluid valve 4. These locking mechanisms 70 serve to connect with the fluid valve 4 that is installed so that the improved fluid valve control device 10 of the present invention can be permanently snapped into place. This prevents the control device 10 from being easily removed, lost, or otherwise displaced.

While the locking mechanism 70 may have multiple forms, in this embodiment, there are two curvatures, a first upper concave curvature 72, and a second lower opposing convex curvature 74. The first curvature has a radius generally between 1 to 0.001, more preferably between 1 to 0.01 inches, and for this embodiment, most preferably about 0.03 inches. The second curvature has a radius generally between 1 to 0.001, more preferably between 1 to 0.01 inches, and for this embodiment, most preferably about 0.012 inches.

A third curvature 75 may form an edge of the locking mechanism 70 which meets the side wall 34 in a semi-perpendicular angle to perpendicular angle being normal to the side wall 34, usually between 80-110 degrees. In this embodiment, the opposite side of the locking mechanism 70 merges smoothly with the inner surface 41 of the side wall 48 of the hex head channel 40.

The height 70H of the locking mechanism 70, measured from the top to the bottom of the locking device, is generally between 1 to 0.01, more preferably between 1 to 0.02 inches, and for this embodiment, most preferably about 0.04 inches. In most embodiments, the height of the locking mechanism 70, measured from the top of the ceiling of the hex head channel 40 to the bottom of the locking device 70, is generally between 1 to 0.01, more preferably between 1 to 0.05 inches, and for this embodiment, most preferably about 0.15 inches. An alternative embodiment of the locking device 70 is shown in FIG. 10 having the position of the curvatures 74' and 75' reversed.

Further Embodiments

In yet other embodiments of the present invention, the number of levers 50 may be increased or decreased as desired. FIGS. 12-18 show the various embodiments that may be manufactured to meet specific requirements depending on the specific valve and configuration. Another distinction between these embodiments are an increased frictional engagement (not numbered) provided on the upper surface of the ceiling 11 of the main body 30.

Figure 18:
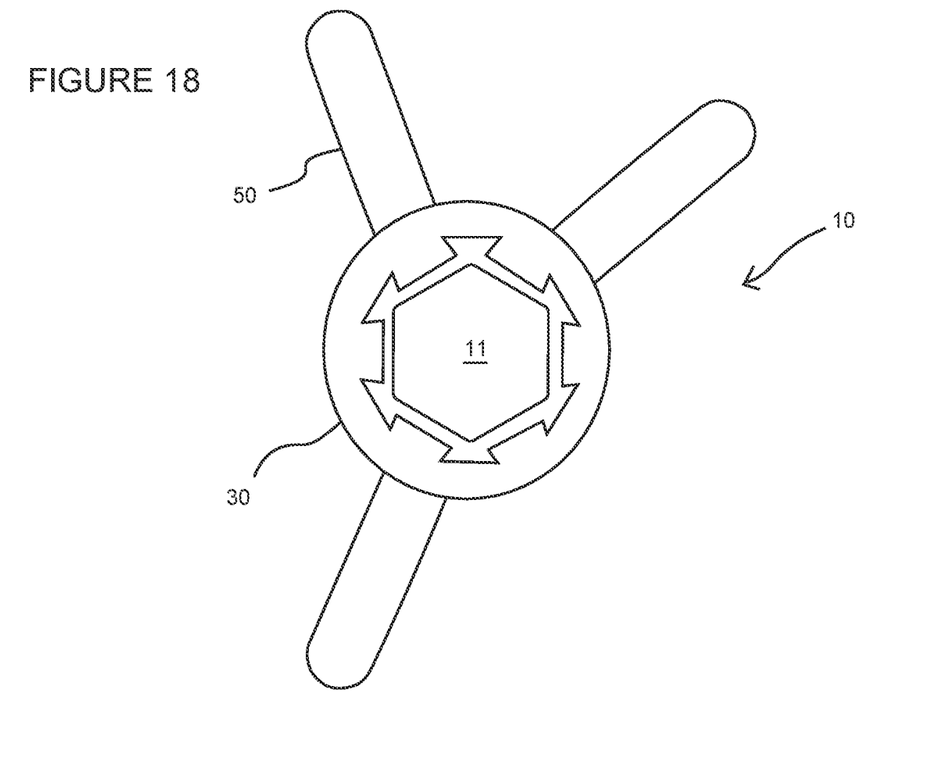

Variations in the distance between the levers 50 are also illustrated, for example, in the embodiment shown in FIG. 18.

Figure 19:
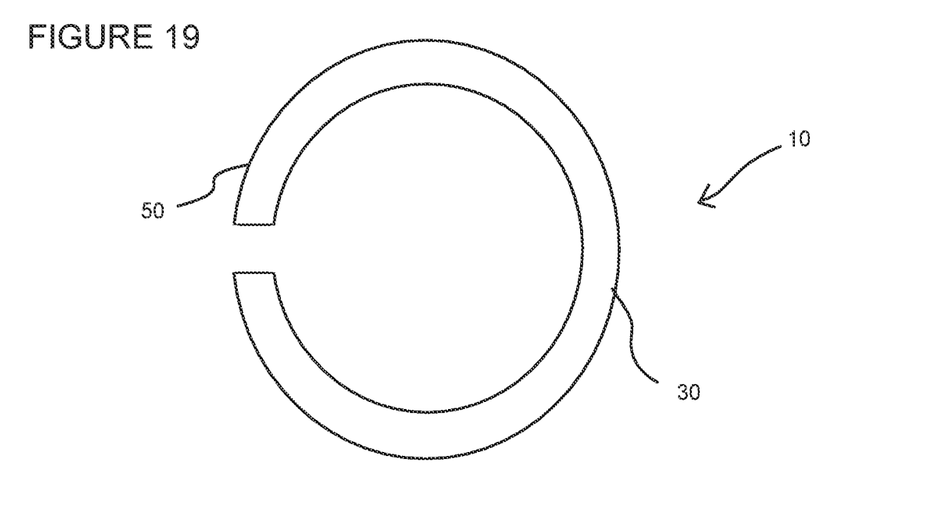

FIG. 19 shows an embodiment that employs a snap ring style for secure mounting as well as a set screw and plastic internal flap.

Method of Use

As previously discussed, the embodiment shown in FIGS. 1-11 is dimensioned for use on a 5/16 hex head valve 4. One method of use discussed will be provided for this embodiment with reference to FIG. 20. The valve 4 shown here is a 16 P50N-S Parker SAE™ Hex Head Pipe Plug 15/16-12 ORB Male Steel, which is commonly used for industrial pipe fittings. The max pressure that this hex pipe plug is designed to handle is 5500 PSI.

Figure 20:
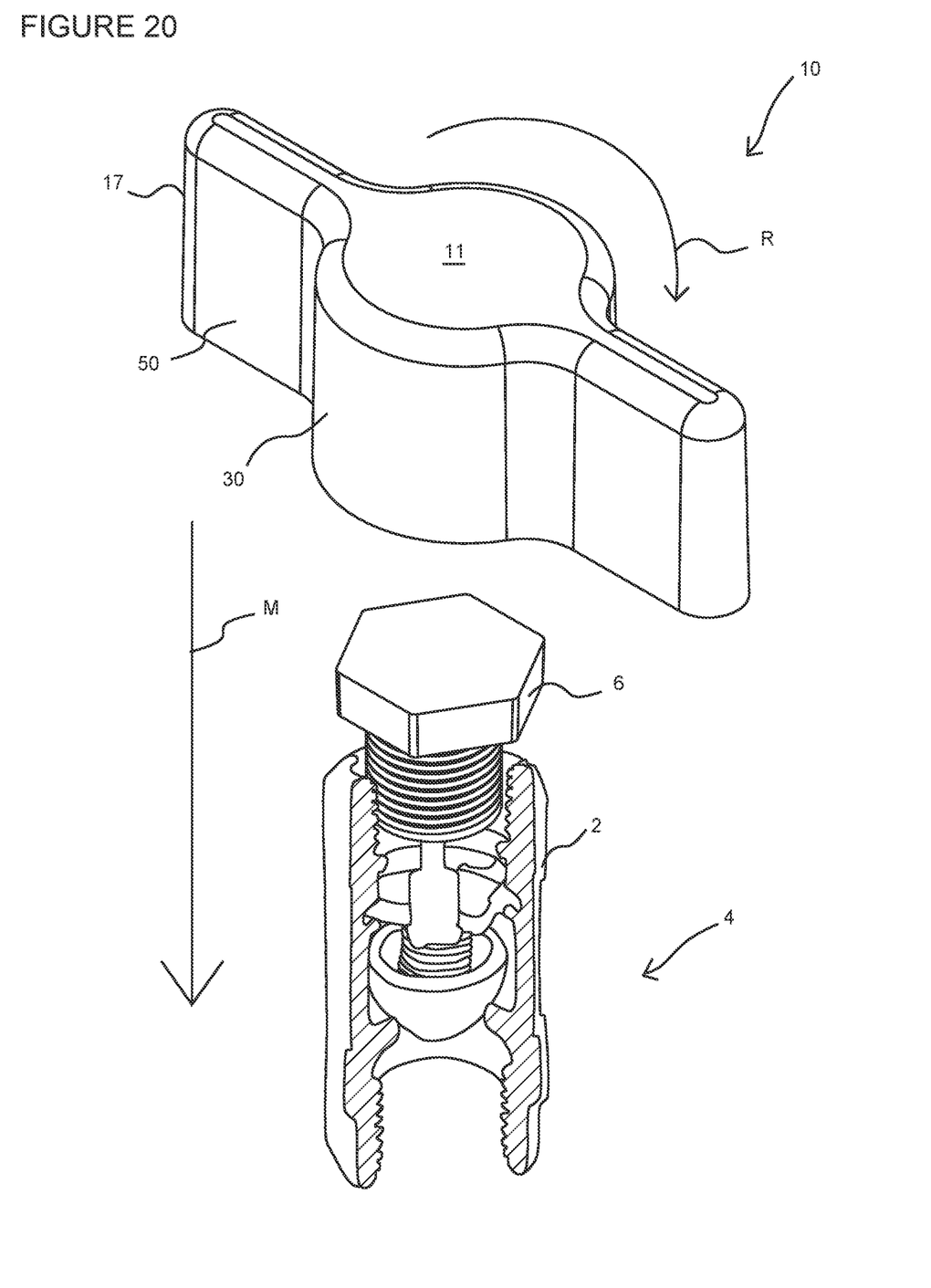
FIG. 20 illustrates the method of installation of the embodiment shown in FIG. 1 onto a fluid valve (shown in partial cross-section).

Applying the control device 10 to the hex head 6 may be done by snapping it into place or mechanically fastening M it so that the locking mechanism 70 interacts in a locking engagement with the hex head 6 of the fluid valve 4. After attaching the control device 10 to the valve 4, the control device 10 may be manually rotated R from a first position to a second position. Thereby enabling the device to turn the valve to the desired setting without further separate tools.

The improved fluid valve control device may be applied to any size-fitting fluid valve. Industrial fittings come standard in brass and steel and are also available in stainless steel. The wide variety of configurations in sizes of the control device 10 from 1/8 inch to 2 inches provides convenient solutions for connecting to different size heads 6. These are ideal for use in hydraulic and other medium and high-pressure applications where hard pipe stability is required.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

LIST OF REFERENCED ELEMENTS

The following reference numbers are adhered to within the specification to refer to those referenced elements within the drawings of the present application.

| | |
|---|---|
| industrial pipe 2 | top 11 |
| standard fluid valve 4 | bottom 12 |
| hex head 6 | front 14 |
| improved control device 10 | rear 15 |
| right side 16 | upper first outer surface 44 |
| left side 17 | transition portion 45 |
| concave filleted corner 18 | upper first inner surface 46 |
| convex filleted edges 19 | corners 47 |
| main body 30 | sides 48 |
| upper surface 31 | lever 50 |
| bottom surface 32 | upper surface 51 |
| side walls 34 | bottom surface 52 |
| connecting wall 35 | sloped outer edge 53 |
| narrow wall portion | inner edge 54 |
| widest wall portion 37 | main wall 55 |
| filleted corners 39 | filleted corners 59 |
| hex head channel 40 | locking features 70 |
| inner surface 41 (of side walls 34) | upper curvature 72 |
| first perimeter bottom 42 | lower curvature 74 |
| second perimeter top 43 | joining corner 75 |

CONCLUSION

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An improved fluid valve control device capable of locking engagement with a hex head of an installed hex head valve, the fluid valve control device comprising:
   a main body having a top wall and six side walls which extend perpendicularly from opposing edges of the top wall;
   an inner hex head channel, defined by the top wall and the six side walls, extending therein;
   at least one lever extending outward from the six side walls of the main body; and
   a locking mechanism extending along an internal surface of the hex head channel, the locking mechanism being integral with and extending outward from the internal surface of the hex head channel;

wherein the locking mechanism facilities irreversible locking engagement of the improved fluid valve control device with the hex head of the installed hex head valve.

2. The improved fluid valve control device of claim 1 wherein the locking mechanism has at least a first curvature and a second curvature being opposite the first curvature.

3. The improved fluid valve control device of claim 1 wherein the locking mechanism consists of six bulges extending outward from six sides of the internal surface of the inner hex head channel.

4. The improved fluid valve control device of claim 1 wherein the locking mechanism has a first curvature and extends inward into the internal surface of the inner hex head channel.

5. The improved fluid valve control device of claim 1 wherein the locking mechanism has at least a first concave curvature and a second convex curvature being opposite the first curvature.

6. The improved fluid valve control device of claim 1 wherein the top wall having varying thicknesses such that a height of the inner hex head channel varies from at least a first height to at least a second height.

7. The improved fluid valve control device of claim 1 wherein the at least one lever extending outward from the side walls of the main body is a first lever, and the fluid valve control device further comprising a second lever extending outward from the side walls of the main body opposite the first lever.

8. The improved fluid valve control device of claim 1 wherein a height of the at least one lever is equal to height of the main body.

9. The method for improved fluid valve control of claim 1 further comprising irreversibly engaging the fluid control device with the hex head valve through irreversible locking engagement of the locking mechanism along the internal surface of six walls of the hex head channel.

10. A method for improved fluid valve control of a previously-installed hex head valve having a hex head, the method comprising:
    providing a fluid control device having a main body having a top wall and side walls which extend perpendicularly from opposing edges of the top wall; an inner hex head channel, defined by the top wall and side walls, extending therein; at least one lever extending outward from side walls of the main body; and a locking mechanism extending along and being integrally formed of an internal surface of the hex head channel;
    aligning the inner hex head channel of the fluid control device with the hex head of the hex head valve;
    manually fastening the fluid control device onto the hex head of the hex head valve by interacting the hex head with the locking mechanism extending along the internal surface of the hex head channel;
    manually engaging the at least one lever extending outward from side walls of the main body, thereby manually rotating the fluid control device via the manual engagement of the at least one lever; and thereby facilitating altering a position of the hex head of the hex head valve from at least a first position to at least a second rotated position manually; and
    leaving the fluid control device irreversibly engaged with the previously installed hex head valve.

11. An improved fluid valve control device capable of irreversible locking engagement with a hex head of a previously installed hex head valve, the fluid valve control device comprising:
    a main body having a top wall and six side walls which extend perpendicularly from opposing edges of the top wall;
    an inner hex head channel, defined by the top wall and the six side walls, extending therein;
    two levers extending outward from opposing sides of the six side walls of the main body, a length of each of the two levers are each individually equal to or less than a height of the main body; and
    a locking mechanism extending along an internal surface of the hex head channel, the locking mechanism being integral with and extending outward from the internal surface of the hex head channel along each of the six side walls;
    wherein the locking mechanism facilitates irreversible locking engagement of the improved fluid valve control device with the hex head of the hex head valve.

12. The improved fluid valve control device of claim 11 wherein the locking mechanism has at least a first curvature formed on a first of the six side walls, and a second curvature formed on a second of the of the six side walls, opposite the first curvature.

13. The improved fluid valve control device of claim 11 wherein the locking mechanism consists of six sloped bulges extending outward from each of the six sides of the internal surface of the inner hex head channel.

14. The improved fluid valve control device of claim 11 wherein the locking mechanism has a first curvature and extends inward into the internal surface of the inner hex head channel.

15. The improved fluid valve control device of claim 11 wherein the locking mechanism has at least a first concave curvature and a second convex curvature being above the first curvature.

16. The improved fluid valve control device of claim 11 wherein the top wall having varying thicknesses such that a height of the inner hex head channel varies from at least a first height to at least a second height.

17. The improved fluid valve control device of claim 11 wherein the at least one lever extending outward from the side walls of the main body is a first lever, and the fluid valve control device further comprising a second lever extending outward from the side walls of the main body opposite the first lever.

18. The improved fluid valve control device of claim 11 wherein a height of the at least one lever is equal to the height of the main body.

19. The improved fluid valve control device of claim 11 wherein the locking mechanism consists of six bulges extending outward from each of the six sides of the internal surface of the inner hex head channel, each of the six bulges formed of a first concave portion and a second convex sloped portion located above the first concave portion to facilitate the improved fluid valve control device snapping into place on the hex head of the hex head valve.

\* \* \* \* \*